United States Patent
Atkinson, Jr.

(10) Patent No.: US 10,687,565 B2
(45) Date of Patent: Jun. 23, 2020

(54) USING A VEST WITH INTEGRATED BULK PRODUCT STORAGE

(71) Applicant: Rick Atkinson, Jr., Canton, GA (US)

(72) Inventor: Rick Atkinson, Jr., Canton, GA (US)

( * ) Notice: Subject to any disclaimer, the term of this patent is extended or adjusted under 35 U.S.C. 154(b) by 232 days.

(21) Appl. No.: 15/867,066

(22) Filed: Jan. 10, 2018

(65) Prior Publication Data

US 2018/0125123 A1 May 10, 2018

Related U.S. Application Data

(62) Division of application No. 14/210,938, filed on Mar. 14, 2014, now Pat. No. 9,867,403.

(60) Provisional application No. 61/792,645, filed on Mar. 15, 2013.

(51) Int. Cl.
*A41D 1/04* (2006.01)
*B65G 65/40* (2006.01)
*A01C 7/02* (2006.01)

(52) U.S. Cl.
CPC .................. *A41D 1/04* (2013.01); *A01C 7/02* (2013.01); *B65G 65/40* (2013.01)

(58) Field of Classification Search
CPC ........................................................ A41D 1/04
USPC ........ 2/69.5, 94, 95, 102, 311, 312; 224/196
See application file for complete search history.

(56) References Cited

U.S. PATENT DOCUMENTS

| | | | |
|---|---|---|---|
| 2,620,479 A | 12/1952 | Buck | |
| 2,864,541 A | 12/1958 | Altick | |
| 3,246,343 A | 4/1966 | Gilligan | |
| 4,213,204 A | 7/1980 | Donlon et al. | |
| 4,268,917 A | 5/1981 | Massey | |
| 4,669,127 A * | 6/1987 | Swanson | A41D 13/0012 2/102 |
| 5,127,565 A | 7/1992 | Grant | |
| 5,195,187 A | 3/1993 | Yang | |
| 5,361,412 A | 11/1994 | Perry | |
| 5,415,222 A | 5/1995 | Colvin et al. | |
| 5,586,703 A | 12/1996 | Radar et al. | |
| 5,689,829 A | 11/1997 | Rose | |
| 5,913,409 A | 6/1999 | Test | |
| 5,940,883 A | 8/1999 | Daoust | |
| 6,397,392 B1 | 6/2002 | Wooley et al. | |
| 6,405,378 B1 | 6/2002 | Garner | |
| 6,516,981 B2 | 2/2003 | Perez et al. | |
| 6,886,739 B1 * | 5/2005 | Tsengas | A01K 5/0114 119/51.01 |
| 7,886,368 B2 * | 2/2011 | Hood | A41D 1/002 2/102 |
| 8,250,671 B2 * | 8/2012 | Shadid | A41D 13/0012 2/94 |

(Continued)

*Primary Examiner* — Timothy L Maust
(74) *Attorney, Agent, or Firm* — Thomas | Horstemeyer, LLP

(57) ABSTRACT

Disclosed are methods of use for various embodiments of a vest with integrated bulk product storage. The vest may be configured to be worn about a person's neck, with a front portion and a back portion. Each of the front and back portions includes one or more integrated bulk product storage compartments. Bulk product is poured into the compartment via a reclosable filling opening at or near the top of the vest, while bulk product is dispensed from the compartment via a reclosable dispensing opening at or near the bottom of the vest. The vest may also function as a safety vest by exhibiting a safety color and/or pattern.

20 Claims, 8 Drawing Sheets

(56) References Cited

U.S. PATENT DOCUMENTS 8,341,765 B2    1/2013   Brodbeck
9,867,403 B2 *   1/2018   Atkinson, Jr. ........... A41D 1/04

* cited by examiner

USING A VEST WITH INTEGRATED BULK PRODUCT STORAGE

CROSS-REFERENCE TO RELATED APPLICATIONS

This application is a division of, and claims priority to, co-pending U.S. patent application entitled "VEST WITH INTEGRATED BULK PRODUCT STORAGE," filed on Mar. 14, 2014, and assigned application Ser. No. 14/210,938, which claims the benefit of U.S. Provisional Application No. 61/792,645 entitled "SAFETY VEST WITH INTEGRATED BULK PRODUCT STORAGE" and filed on Mar. 15, 2013, both of which are incorporated herein by reference in their entireties.

BACKGROUND

Safety vests may be worn for many reasons. Joggers and construction workers may wear safety vests to remain visible to passing motorists, especially during low visibility conditions. Hunters may be required to wear safety vests in order to remain visible to other hunters, thereby avoiding accidental shootings. Such safety vests may meet various criteria for visibility. For example, the safety vests may be in a particular color, such as safety orange, fluorescent green, bright yellow, or another color. The safety vests may have a particular pattern or no pattern. The safety vests may be made of a material having a certain reflectivity to reflect light in low light conditions.

Hunters may have to carry various gear and supplies while on a hunting expedition. Hunting typically takes place in rural areas that may not be directly accessible via road. Hunters may use all-terrain vehicles (ATVs) to travel off-road, but ATVs can be expensive and difficult to transport to the hunting location. Thus, hunters may have to carry their gear and supplies on their person.

One type of supply carried by hunters may be bulk products used to attract their game. For example, hunters may carry corn, soybeans, grains, and/or other bulk products to attract deer, hogs, turkey, bear, and/or other wild game. When using deer corn, for example, a hunter will typically spread large amounts of corn in potentially multiple locations. The hunter may use 20 to 40 pounds of deer corn on a single trip. Deer corn and other bulk products may be sold in 20 pound bags, 40 pound bags, or other sizes. It may be difficult to carry such bags by hand, over the shoulder, etc., for the distances and elevations traveled during hunting.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Various embodiments of the present disclosure present a vest with integrated bulk product storage. In some embodiments, the vest may correspond to a safety vest, comprised of a fabric or material of a certain pattern, color, etc., in order for a person wearing the safety vest to be visible to other people. For example, hunters may be required to wear a blaze orange outer garment above the waist during firearm hunting season, and the vest herein may meet that requirement. However, exceptions may apply during bow hunting seasons, and hunters may prefer to wear camouflage patterns and/or other non-orange garments when possible. Thus, in some embodiments, the vest may be comprised of a camouflage or other pattern. In some embodiments, the vest may be reversible, to function as a safety vest on one side and a non-safety vest on the other side. For example, one side of the vest may be a safety orange color, and the flip side of the vest may be a camouflage pattern.

As mentioned, the vests described herein include integrated bulk product storage. Rather than hauling a separate 50 pound bag of corn or other feed product, a hunter can fill vests such as those described herein and then reasonably comfortably wear the vest during a hunting expedition. The vests described herein may have one or more reclosable openings to facilitate an easy discharge of the bulk product on site. A hunter can simply walk down a trail wearing the vest while the corn or other bulk product is discharged through a reclosable opening. If the vest with integrated bulk product storage is configured as a safety vest, the hunter may be able to wear the vest with integrated bulk product storage without wearing another safety vest as an outer garment.

Figure 1:
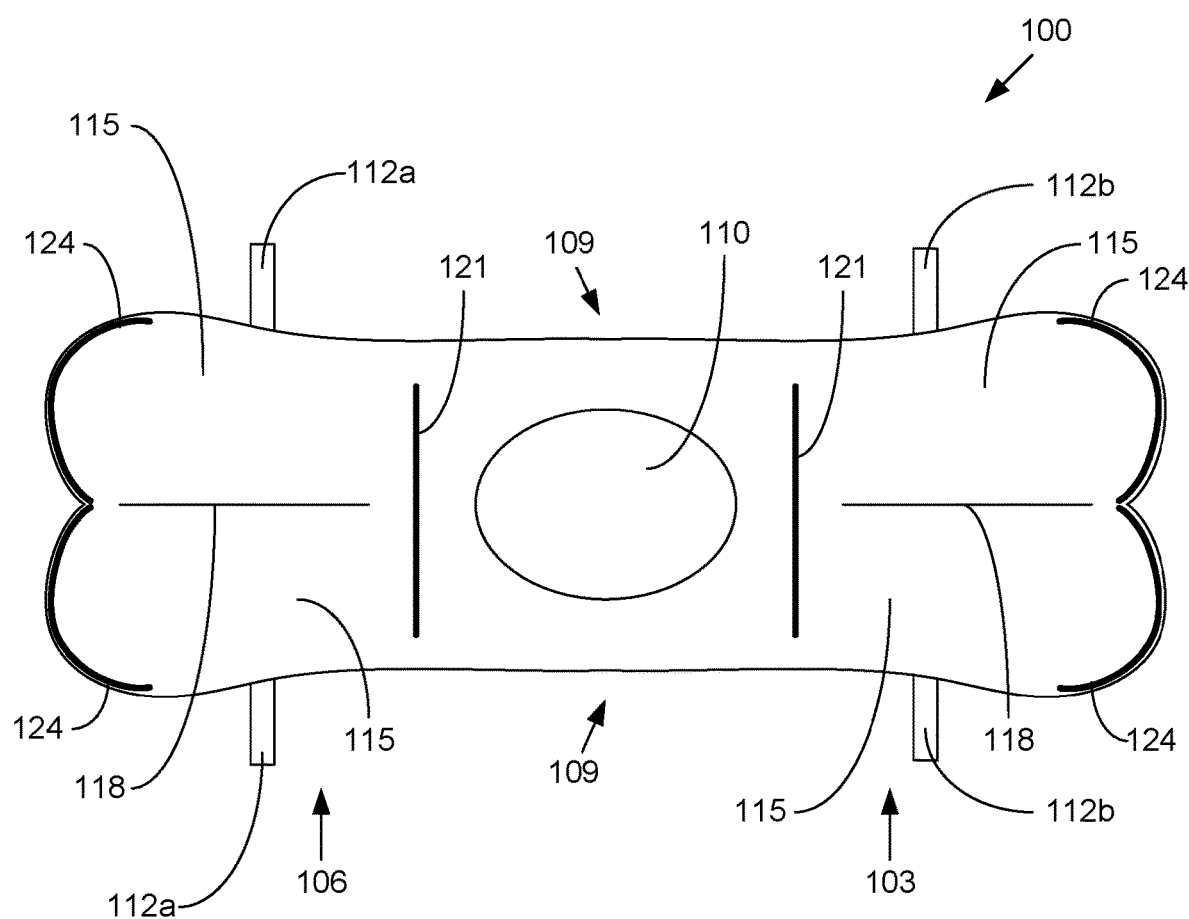
FIG. 1 depicts a top view of a vest according to one embodiment of the present disclosure.

FIG. 1 depicts a top view of a vest 100 according to one embodiment of the present disclosure. The vest 100 includes a front portion 103 configured to be placed on the anterior of a person's body, a back portion 106 configured to be placed on the posterior of a person's body, and two shoulder-bearing portions 109 attaching the front portion 103 to the back portion 106 and configured to be worn on a person's shoulders. As shown, the front portion 103, the back portion 106, and the shoulder-bearing portions 109 may be constructed of a top layer of fabric or other material stitched, bonded, or otherwise attached to a bottom layer of fabric or other material.

A neck opening 110 may be provided for a person's head to pass through. Though an elliptical neck opening 110 is depicted, it is understood that polygons and/or other shapes may be employed.

As shown in FIG. 1, the shoulder-bearing portions 109 may be integral to the front portion 103 and the back portion 106. In some cases, the shoulder-bearing portions 109 may include padding to ease the pressure on the person's shoulders. In some embodiments, the shoulder-bearing portions 109 comprise shoulder straps that are attached by way of stitching to the tops of each of the front portion 103 and the back portion 106. In another embodiment, the tops of each of the front portion 103 and the back portion 106 includes two eyelets to facilitate attachment to removable shoulder straps. Other approaches to attaching the shoulder straps may be used in other embodiments.

Additional straps with ties, buckles, or other attachments may be employed to attach the front portion to the back portion at the person's sides. Such side straps may facilitate distributing weight more evenly and provide a more secure way to walk through wooded or other difficult terrain. For example, FIG. 1 shows attachment straps 112a and 112b, where the straps 112a are configured to attach to the straps 112b by tying, using buckles, hook and loop fasteners, etc.

The front portion 103 and the back portion 106 of the vest 100 may each be configured to store bulk products such as corn, grains, seeds, meal, flour, etc. As depicted in FIG. 1, each of the front portion 103 and the back portion 106 may include respective sets of bulk product storage compartments 115. In one embodiment, the entire front portion 103 and the entire back portion 106 may each correspond to a single bulk product storage compartment 115. In other embodiments, multiple bulk product storage compartments 115 may be provided within the front portion 103 or back portion 106, or a bulk product storage compartment 115 may not consume the entirety of the front portion 103 or the back portion 106. For example, bulk product storage compartments 115 may be at least partially divided by central longitudinal stitchings 118 between the top and bottom layers. The central longitudinal stitchings 118 may go all the way to the bottom of the bulk product storage compartments 115, thereby facilitating a complete division, or the central longitudinal stitchings 118 may end before the bottom. The bulk product storage compartments 115 may be specially lined or unlined.

Unlike a backpack, the vest 100 is configured to carry weight at both the person's posterior and anterior, thereby promoting stability when walking. It is noted that different sizes of the vest 100 may be manufactured for different body types (e.g., adult male, adult female, child, etc.) and for carrying different quantities of the bulk product.

The bulk product may be poured directly into the front portion 103 and/or the back portion 106 or a bag containing the bulk product may be placed within the front portion 103 and/or the back portion 106. The front portion 103 and/or the back portion 106 may have respective reclosable filling openings 121 proximal to the neck opening 110, i.e., at or near the top of the front portion 103 and the back portion 106 when donned by a person. The reclosable filling openings 121 may include zippers, buttons, and/or other closures. As shown, a single reclosable filling opening 121 may provide access to one or both of the bulk product storage compartments 115 in the front portion 103. Likewise, a single reclosable filling opening 121 may provide access to one or both of the bulk product storage compartments 115 in the back portion 106. In other embodiments, one or more separate reclosable filling openings 121 may provide access to each of the bulk product storage compartments 115.

Each of the bulk product storage compartments 115 may include a reclosable dispensing opening 124 at or near the bottom of the bulk product storage compartment 115. The reclosable dispensing opening 124 may include zippers, buttons, and/or other closures. When the vest 100 is donned by a user and the reclosable dispensing opening 124 is opened, the reclosable dispensing opening 124 allows the bulk product within the corresponding bulk product storage compartment 115 to pour out. Thus, as the user walks, the bulk product pours out onto the ground via the reclosable dispensing opening 124. Where zippers are employed, the zippers may be used such that they open outwardly from a center longitudinal line of the vest 100 or inwardly toward the center longitudinal line of the vest 100. Thus, depending on the configuration, the zippers may open when pulled towards the center line, or the zippers may open when pulled away from the center line. Which direction the zipper is pulled may depend on the shape of the vest 100—pulling in at least a partially downward direction may be easier for the user. Also, pulling the zipper inwardly may cause the outward portion to open first, which may provide a better dispersion of the bulk product when dispensed.

Although a curved bottom shape of the bulk product storage compartments 115 is shown in FIG. 1, other shapes may be used as well. For example, the bottom portions of the bulk product storage compartments 115 may be angled so as to direct the bulk product towards a certain portion of the reclosable dispensing opening 124, so that the first portion that is opened is the lowest portion of the bulk product storage compartment 115.

In one embodiment, a first zipper may be placed at the bottom for bulk release and a second zipper may be placed at the side of the vest 100 to release a handful of product. For example, the user may reach into a bulk product storage compartment 115 by way of the side zipper and grab a handful of product. Button closures and/or other closures may be employed in other embodiments.

The vest 100 may be constructed of a heavy duty canvas, duck cloth, burlap, fabric, plastic, or other material. In the embodiment of FIG. 1, each of the front portion 103 and the back portion 106 is constructed of two layers of material, a top layer and a bottom layer, that are sewn together. The vest 100 may be relatively lightweight and capable of being folded down to a small size. The front portion 103 and the back portion 106 of the vest 100 may have stitching sufficient to support 50 pounds or some other quantity of product. The front portion 103 and the back portion 106 may be the same size or a different size. The front portion 103 and the back portion 106 may be the same shape or a different shape. The front portion 103 and the back portion 106 may be rounded, hexagonal, or some other shape in various embodiments. Any attachment straps 112 or shoulder straps that are present may be adjustable as to length.

Although FIG. 1 depicts a top side of the vest 100, it is understood that the bottom side of the vest 100 may mirror the top side or may differ in some way. For example, both the top and bottom sides of the vest 100 may have respective reclosable filling openings 112. Alternatively, the reclosable filling openings 112 may be present only on one of the top or bottom sides of the vest 100. The reclosable dispensing openings 124 may be positioned such that they are at the edge of both the top and bottom sides. Alternatively, a reclosable dispensing opening 124 may be present on one or both of the top or bottom sides of the vest 100. In some cases, separate bulk product storage compartments 115 may be accessible from one or both of the top or bottom sides. If so, a middle dividing layer between the top and bottom layers may be present. Also, as shown, the left and right sides of the vest 100 are symmetrical, but in other embodiments, the left and right sides may differ in some way.

Figure 2:
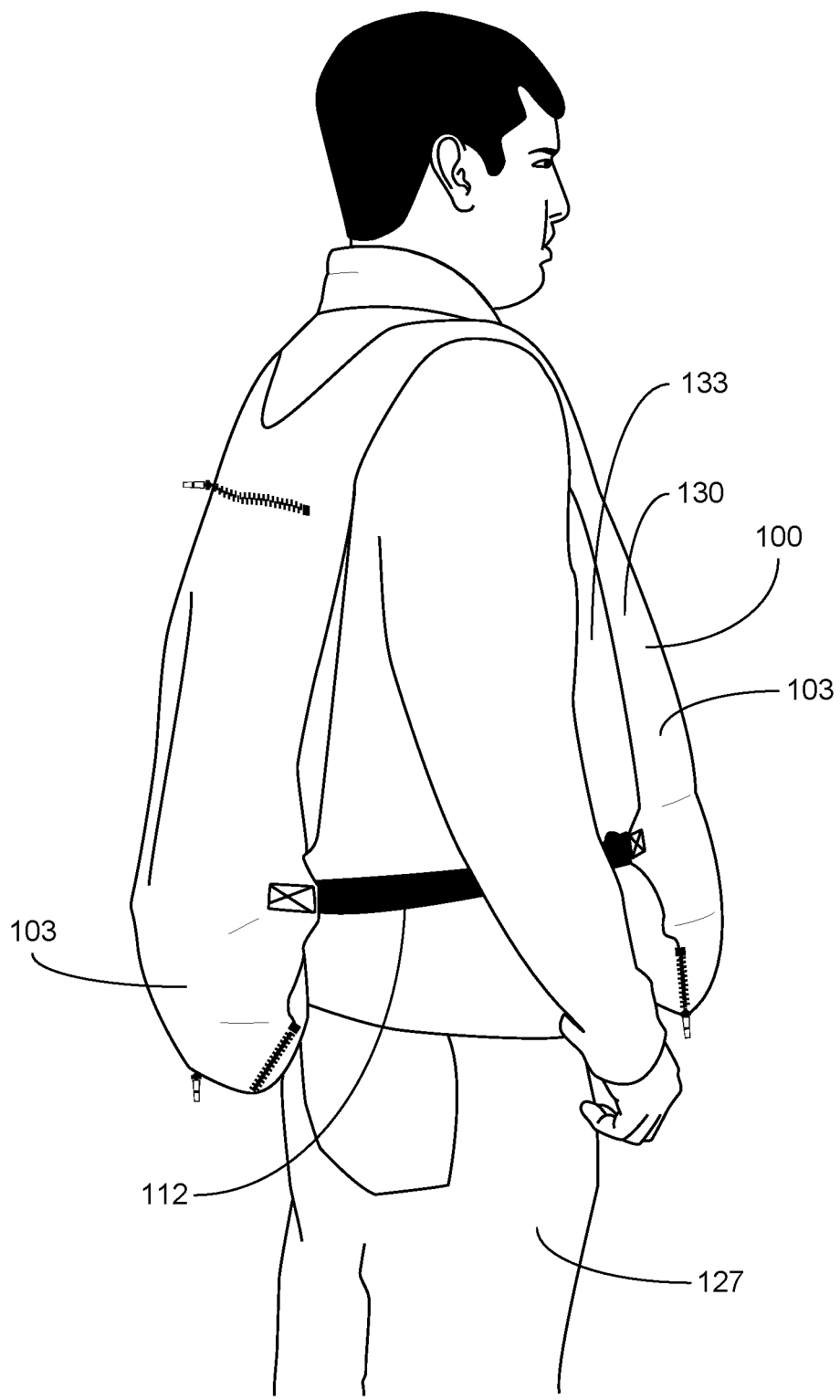
FIG. 2 provides an example side view of a filled version of the vest of FIG. 1 when donned by a person.

FIG. 2 provides an example side view of a filled version of the vest 100 of FIG. 1 when donned by a person 127. Both the front portion 103 and the back portions 106 of the vest 100 are filled with bulk product, and the attachment straps 112 have been secured near the waist of the person 127. As this is a side view of a filled vest 100, portions of both the top side 130 and the bottom side 133 are visible.

Figure 3:
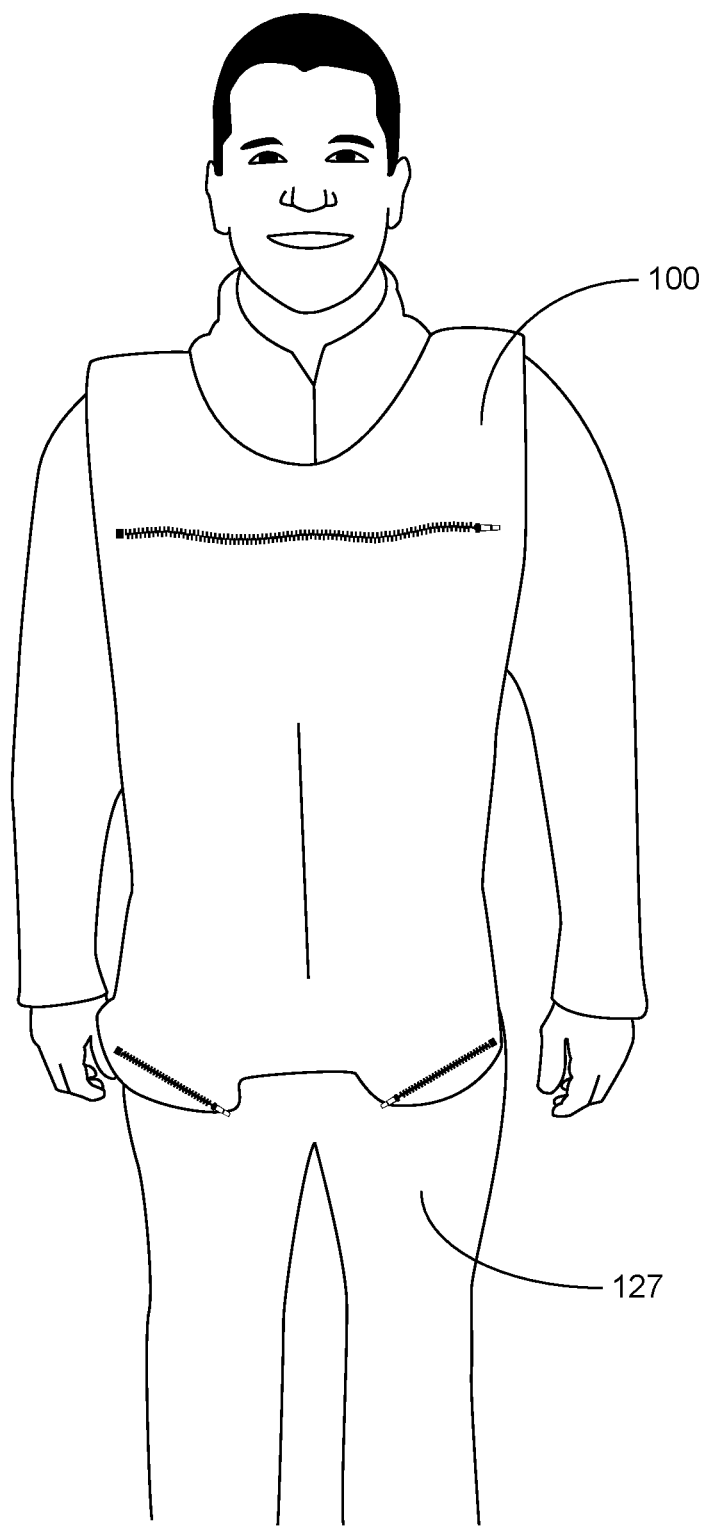
FIG. 3 provides an example front view of the vest of FIG. 2 when donned by the person.
Figure 4:
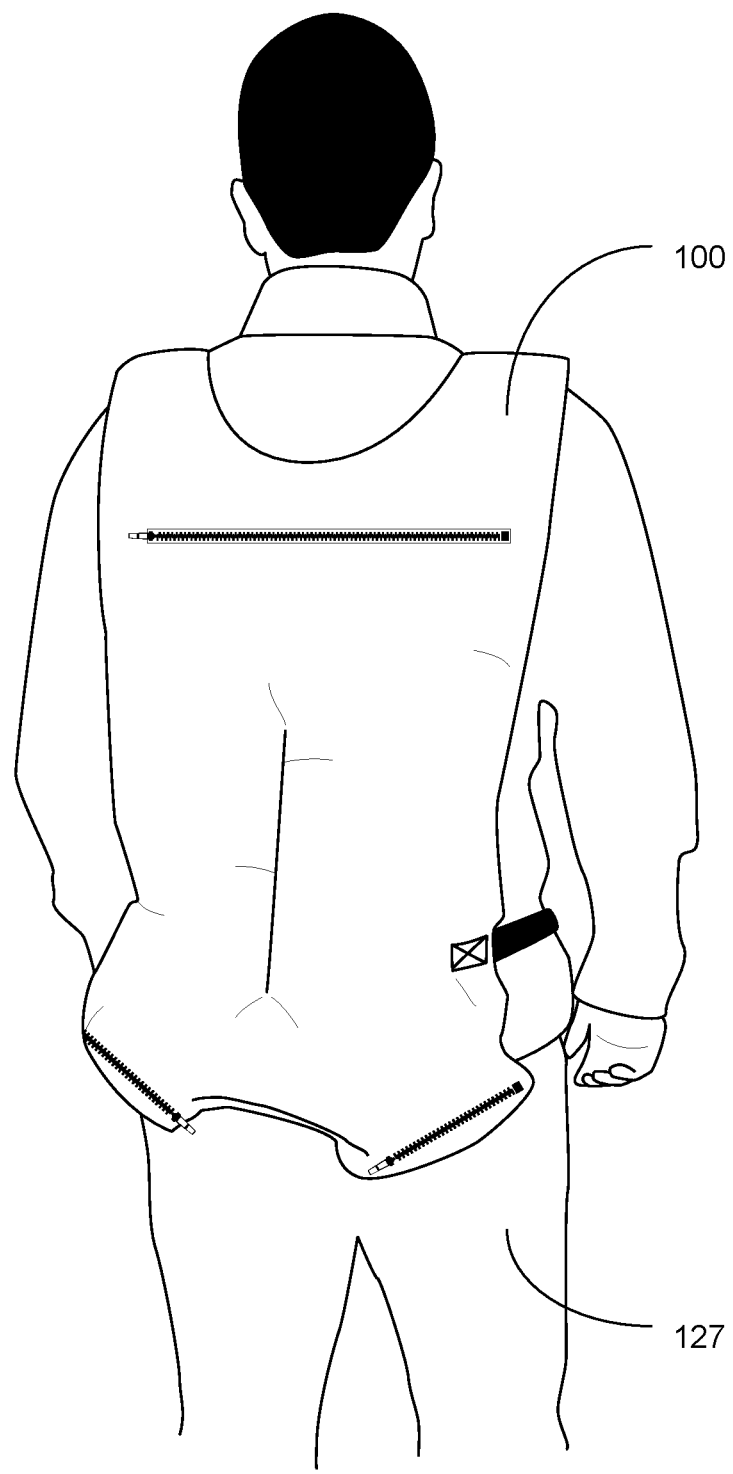
FIG. 4 provides an example back view of the vest of FIG. 2 when donned by the person.
Figure 5:
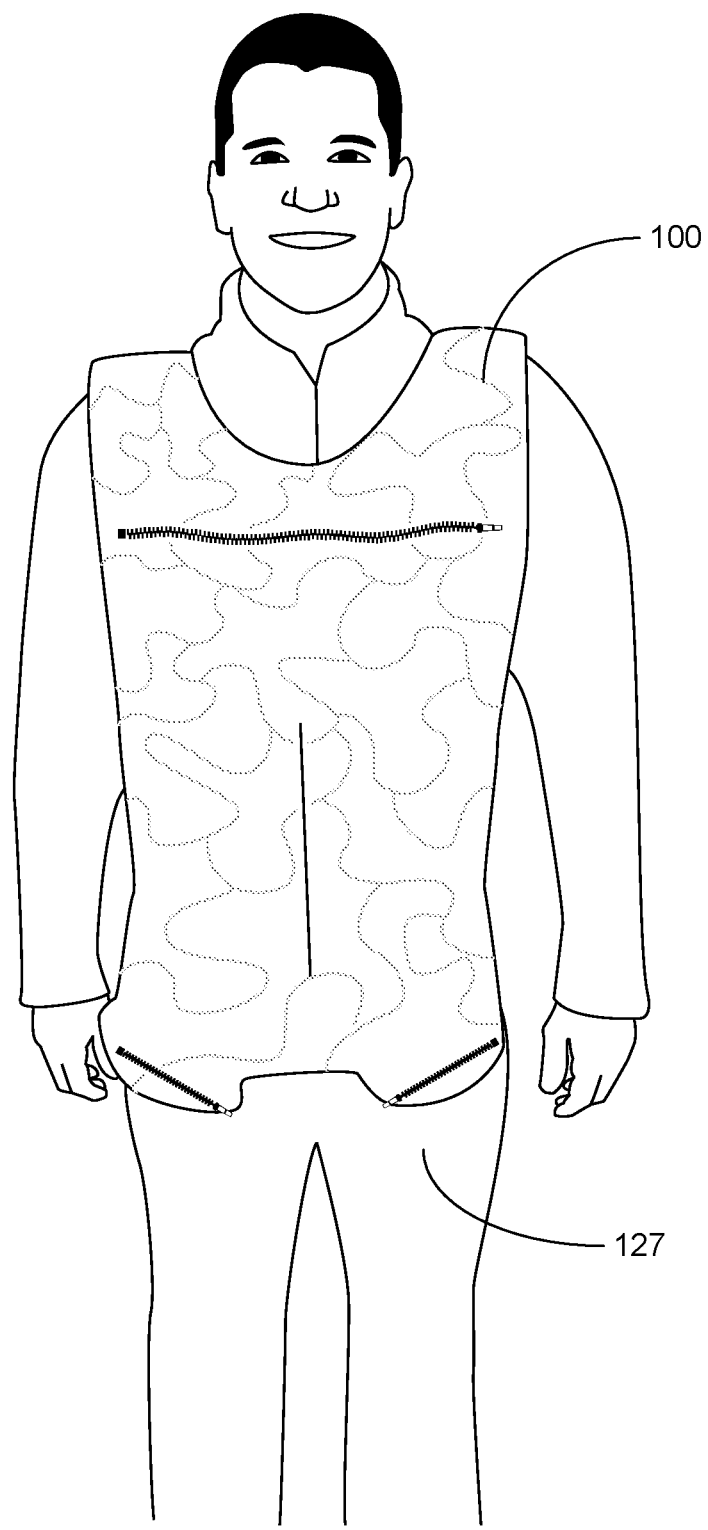
FIG. 5 provides an example variation on the front view of the vest of FIG. 3, where the vest worn by the person has a camouflage pattern on at least the visible side.
Figure 6:
FIG. 6 is an example variation on the back view of the vest of FIG. 4, where the vest worn by the person has a camouflage pattern on at least the visible side.
Figure 7:
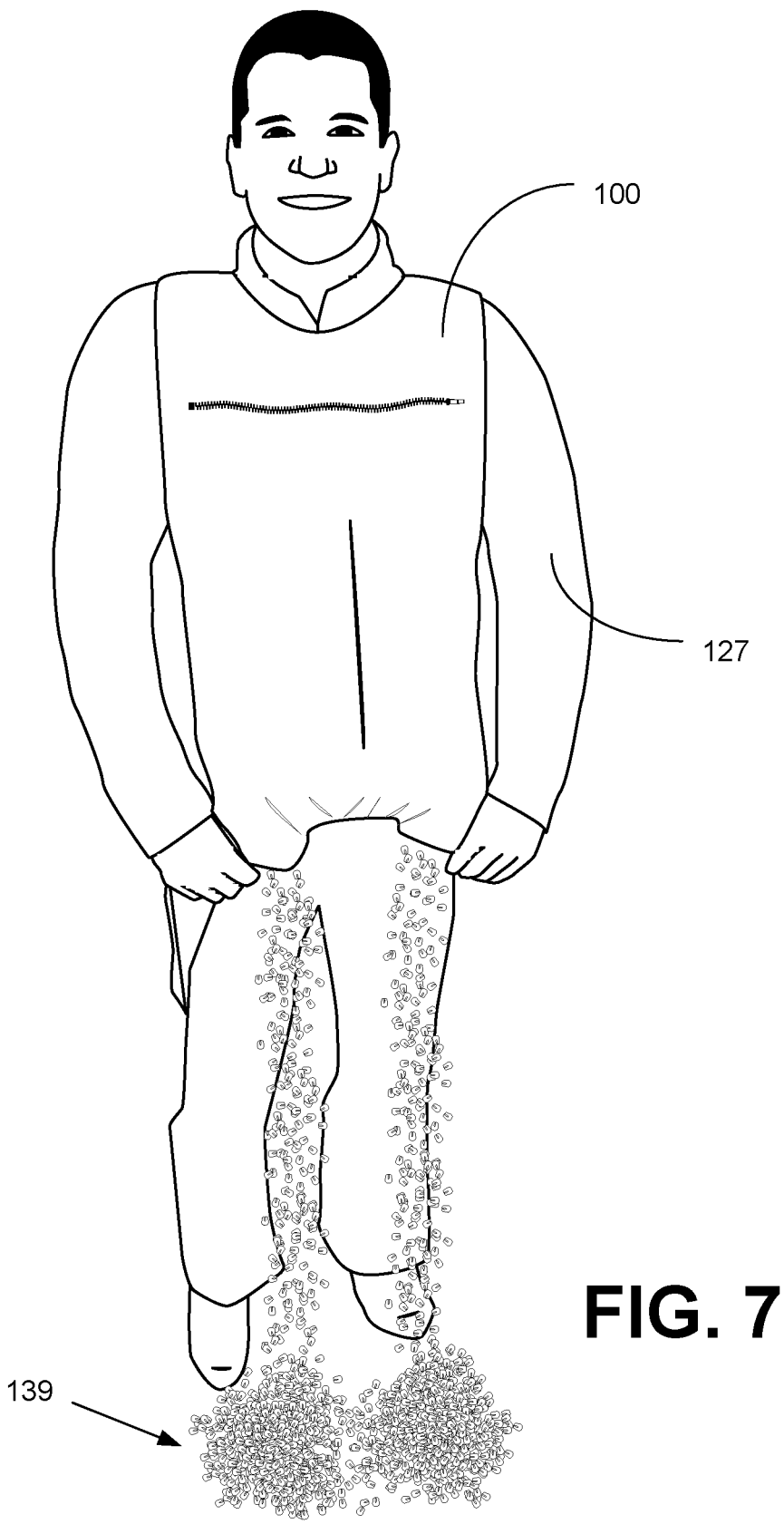
FIG. 7 illustrates an example of a bulk product being dispensed by a person donning the vest of FIG. 2.

FIG. 3 provides an example front view of the vest 100 of FIG. 2 when donned by the person 127. FIG. 4 provides an example back view of the vest 100 of FIG. 2 when donned by the person 127. FIG. 5 provides an example variation on the front view of FIG. 3, where the vest 100 worn by the person 127 has a camouflage pattern on at least the visible side. Similarly, FIG. 6 is an example variation on the back view of FIG. 4, where the vest 100 worn by the person 127 has a camouflage pattern on at least the visible side. FIG. 7 illustrates an example of a bulk product 139 being dispensed by a person 127 donning the vest 100.

Figure 8:
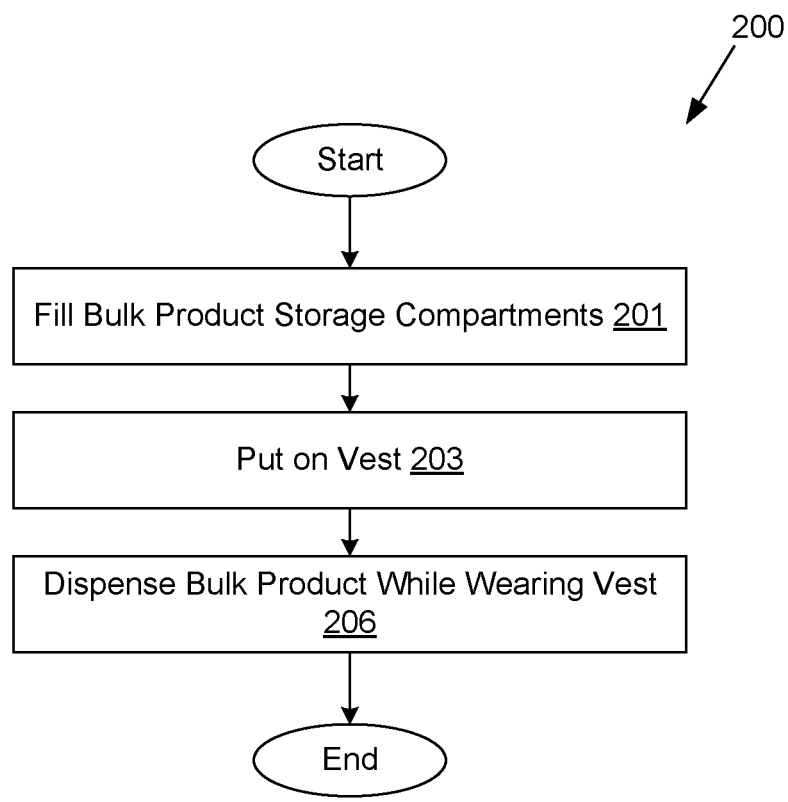
FIG. 8 illustrates an example flowchart showing steps of an example method of use of the vest of FIG. 1 according to various embodiments.

FIG. 8 illustrates an example flowchart 200 illustrating steps of an example method of use of the vest 100 (FIG. 1) according to various embodiments. Beginning with box 201, a user fills one or more bulk product storage compartments 115 (FIG. 1) in the vest 100 with bulk product 139 (FIG. 7). To this end, the user may open one or more reclosable filling openings 121 (FIG. 1) and pour the bulk product 139 in via the reclosable filling openings 121. One or more longitudinal stitchings 118 (FIG. 1) may be used to distribute the bulk product 139 among multiple bulk product storage compartments 115.

In box 203, the user puts on, or dons, the vest 100 by placing his or her head into the vest 100 via the neck opening 110 (FIG. 1). The user may also secure and/or adjust one or more pairs of attachment straps 112 (FIG. 1) and/or one or more shoulder straps. In some cases, the user may fill or refill one or more bulk product storage compartments 115 while the vest 100 is being worn. In box 206, the user dispenses the bulk product 139 while wearing the vest 100 by opening one or more of the reclosable dispensing openings 124 (FIG. 1). Thereafter, the flowchart 200 ends.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method for storing and dispensing a bulk product, comprising:
filling each of a plurality of bulk product storage compartments integrated in a vest by pouring the bulk product into each of a plurality of reclosable filling openings of the plurality of bulk product storage compartments, wherein a first bulk product storage compartment of the plurality of bulk product storage compartments is on a first side of a center line of the vest, and a second bulk product storage compartment of the plurality of bulk product storage compartments is on a second side of the center line of the vest;
donning the filled vest by placing a head of a person through a neck opening of the filled vest; and
dispensing the bulk product by opening each of a plurality of reclosable dispensing openings of the bulk product storage compartments, wherein each of the plurality of reclosable dispensing openings has a respective zipper, and opening each of the plurality of reclosable dispensing openings further comprises:
opening the respective zipper of each of the plurality of reclosable dispensing openings by pulling the respective zipper toward the center line of the filled vest; or opening the respective zipper of each of the plurality of reclosable dispensing openings by pulling the respective zipper away from the center line of the filled vest.

2. The method of claim 1, wherein donning the filled vest further comprises securing each of a pair of attachment straps that couple a front side of the vest to a back side of the vest.

3. The method of claim 1, wherein a first side of the vest exhibits a safety color or pattern, and a second side of the vest exhibits a camouflage pattern.

4. A method for storing and dispensing a bulk product, comprising:
filling each of a plurality of bulk product storage compartments integrated in a vest by pouring the bulk product into each of a plurality of reclosable filling openings of the plurality of bulk product storage compartments, wherein the plurality of bulk storage compartments are formed within a single top layer of material attached to a single bottom layer of material, and at least two of the plurality of bulk storage compartments are at least partially divided from one another by a central longitudinal stitching between the single top layer of material and the single bottom layer of material;
donning the filled vest by placing a head of a person through a neck opening of the filled vest; and
dispensing the bulk product by opening each of a plurality of reclosable dispensing openings of the bulk product storage compartments.

5. The method of claim 4, wherein each of the plurality of reclosable dispensing openings has a respective zipper, the respective zipper being configured to open when pulled away from a center line of the filled vest.

6. The method of claim 1, wherein the bulk product comprises corn.

7. The method of claim 1, wherein the vest is comprised of a camouflage pattern.

8. The method of claim 1, wherein the vest is comprised of a safety orange color.

9. The method of claim 1, wherein the plurality of bulk product storage compartments are formed within a single top layer of material attached to a single bottom layer of material.

10. The method of claim 1, wherein the neck opening is elliptical.

11. The method of claim 1, further comprising walking while the bulk product is dispensed onto the ground.

12. The method of claim 1, further comprising closing each of the plurality of reclosable dispensing openings after the bulk product has been dispensed.

13. The method of claim 1, further comprising refilling at least one of the plurality of bulk product storage compartments with additional bulk product through at least one of the plurality of reclosable filling openings while the vest is donned by the person.

14. The method of claim 1, wherein the vest further comprises a padding disposed within a top layer stitched to a bottom layer of a pair of shoulder-bearing portions of the vest.

15. The method of claim 4, wherein each of the plurality of reclosable dispensing openings has a respective zipper, the respective zipper being configured to open when pulled towards a center line of the filled vest.

16. The method of claim 4, wherein at least one of the bulk product storage compartments is located on a front side of the vest, and at least another one of the bulk product storage compartments is located on a rear side of the vest.

17. The method of claim 4, wherein the plurality of bulk product storage compartments comprise a front set of bulk product storage compartments and a back set of bulk product storage compartments.

18. A method for storing and dispensing a bulk product, comprising:
- filling each of a plurality of bulk product storage compartments integrated in a vest by pouring the bulk product into each of a plurality of reclosable filling openings of the plurality of bulk product storage compartments, wherein a single reclosable filling opening of the plurality of reclosable filling openings provides access to at least two of the plurality of bulk product storage compartments;
- donning the filled vest by placing a head of a person through a neck opening of the filled vest; and
- dispensing the bulk product by opening each of a plurality of reclosable dispensing openings of the bulk product storage compartments.

19. A method for storing and dispensing a bulk product, comprising:
- filling each of a plurality of bulk product storage compartments integrated in a vest by pouring the bulk product into each of a plurality of reclosable filling openings of the plurality of bulk product storage compartments;
- donning the filled vest by placing a head of a person through a neck opening of the filled vest; and
- dispensing the bulk product by opening each of a plurality of reclosable dispensing openings of the bulk product storage compartments, wherein a first reclosable dispensing opening of the plurality of reclosable dispensing openings is located at a bottom of a particular bulk product storage compartment of the plurality of bulk product storage compartments, and a second reclosable dispensing opening of the plurality of reclosable dispensing openings is located at a side of the particular bulk product storage compartment.

20. A method for storing and dispensing a bulk product, comprising:
- filling each of a plurality of bulk product storage compartments integrated in a vest by pouring the bulk product into each of a plurality of reclosable filling openings of the plurality of bulk product storage compartments, wherein the plurality of bulk product storage compartments comprise a front set of bulk product storage compartments and a back set of bulk product storage compartments, and a single opening provides access to at least two bulk product storage compartments of either the front set or the back set of bulk product storage compartments;
- donning the filled vest by placing a head of a person through a neck opening of the filled vest; and
- dispensing the bulk product by opening each of a plurality of reclosable dispensing openings of the bulk product storage compartments.

* * * * *